UNIT RECORD TRANSLATING MOUNTING

Filed Dec. 20, 1966 2 Sheets-Sheet 1

INVENTOR
WILBERN F. DAVIS

BY John J. McCormack

ATTORNEY

INVENTOR
WILBERN F. DAVIS
BY John J. McCormack
ATTORNEY

United States Patent Office 3,416,790

Patented Dec. 17, 1968

3,416,790

UNIT RECORD TRANSLATING MOUNTING

Wilbern F. Davis, Sharon, Mass., assignor to Honeywell Inc., Minneapolis, Minn., a corporation of Delaware Filed Dec. 20, 1966, Ser. No. 603,204
11 Claims. (Cl. 271—51)

ABSTRACT OF THE DISCLOSURE

Pinch roll apparatus for selectively advancing punched cards and including a pivotable, resilient mounting assembly for the displaceable pinch roll, the assembly being solenoid-pivoted as a unit with respect to the machine frame for card engagement; and further being internally, and resiliently, collapsible (pivotable within itself) for accommodating variances from a nominal card thickness without disturbing solenoid engagement.

PROBLEMS, INVENTION FEATURES

In the data processing arts, it is appreciated that unit record advance mechanisms, such as for stepping punched cards across a read station, must translate the records at very high (computer record handling) speeds, yet in very precise alignment. It is understandably difficult to provide such precision translation at such speeds. This is doubly difficult to accomplish when one is required to use mechanisms which are structurally simple, easy to repair and reliable over a long life. For instance, in the operation of pinch roll mechanisms where the "pinching" roll is characteristically pivoted from a prescribed "rest" position to a prescribed record-engaging, "drive" position, it commonly happens that the pinch roll surface is abraded away somewhat or that a related stressing of its mounting mechanism occurs. This often causes the roll surface to deviate from the prescribed "engagement-locus," leading to a less positive engagement with the records, inducing erratic record advance, and the like. Of course, with such a frictional drive member, the engaging force of the rolls against the intermediate record is relatively critical; that is, below a given engaging force, slippage will occur and advance velocity be degraded. To further compilcate this problem of maintaining a minimum roll-to-record engaging force, various anomalies in record thickness, such as bumps, hollows, protrusions and the like, often occur, along with occasional overall swelling or shrinking. To tolerate such thickness anomalies and yet still engage records positively requires that the pinch rolls stay "record-engaged" over a spread of inter-roll gap distances—no easy feat, especially using solenoid actuation. Thus, a common problem in the art is to maintain a prescribed minimum frictional engaging force between computer records and advance roll means despite variances in record thickness; and to do so over a long reliable operating life, despite the high operating speeds and precision alignment characteristically required in data processing apparatus. The present invention provides a surprisingly simple answer to this multi-faceted problem.

It is often advantageous in the art to activate frictional record advancing mechanisms, such as the aforementioned pinch roll, with solenoid means. Such solenoid means characteristically include electromagnet poles arranged to attract an armature member carrying the pinch roll, etc. for selective engagement of the roll against the records to thereby translate them. However, it will be recognized by those skilled in the art that such solenoid-actuated mechanisms cannot tolerate much pole-armature spreading without "releasing" and therefore aggravate the aforementioned problem of maintaining a prescribed engagement force on the driving member despite "back-off" impulses such as from the aforementioned thickness anomalies. For example, solenoids are notoriously sensitive to armature vibration. That is, it is well known that if a solenoid-held driving element (armature) is only slightly joggled, or bounced upwardly (for instance, by a bump on the record), this may, at times, separate the armature and the attracting magnet poles sufficiently to irreversibly reduce the armature-attracting force (inverse square dependency) and cause the poles to release the armature, thus disengaging the drive element. This problem does not exist with a strictly mechanical advance-activator, of course. The present invention provides a solution to this apparent inability of solenoid actuators to tolerate "back-off" impulses from a record. Thus, the invention is especially advantageous for, and adaptable to, solenoid-actuated, frictionally-engaged advance mechanisms.

Various pivot arrangements have been used with pinch rolls of the aforementioned type. However, workers in the art will recognize that prior art mounting arrangements have characteristically located the (pinch-roll) pivot-point too far from the plane of the record (e.g. the surface of a punched card). This, undesirably, prevents the roll from pressing normally against the record and, in turn, against the companion roll, thus degrading the efficiency and reliability of engagement. For instance, such a pivotig will allow a slight shift in the engagement-locus (e.g. top of a card bump) to skew the engagement force out of the normal and thus reduce its driving efficiency. The flexure pivot mounting arrangement according to the invention, however, locates the pivot point virtually at the sheet surface; doing so for both the "normal" and the "overtravel" modes. This arrangement avoids these problems, assuring a more normal sheet/roll impact over a range of engagement loci.

The described embodiment of the invention may also be characterized in that it provides selective-sheet-advance mechanisms using extremely simple structures that are inexpensive to fabricate and that incorporate a number of reliable, multi-function parts, such as a compound flexure pivot arrangement for dual pivoting-first, of an armature relative the machine frame and—second of the advance roll relative to the armature. By virtue of this construction, a record advance mechanism is provided which is inherently very reliable, for instance, having no abrading wear points to malfunction and wear out. Also, it is significant that this mechanism according to the invention is capable of operating reliably at today's very high data handling speeds.

Accordingly, it is an object of the invention to provide a fractional record advance mechanism and pivot mounting therefor having the aforementioned and related features and advantages. Another object is to provide such a mechanism mounting using a dual flexure-pivot arrangement employing pivot mountings which are interdependent and which accommodate a resilient overtravel of the record engaging element. Another object is to provide such a mechanism using commonly-mounted strip flexures for both pivot mountings. Still another object is to provide such a mechanism having few parts and no significant abrasive-wear points, thus having increased operative reliability over a longer life. A related object is to provide such resilient means to accommodate prescribed pinch roll positioning anomalies.

Yet another object is to provide such a mechanism for engaging a pinch roll with unit records so as to assure application of a prescribed minimum advancing thrust on them. A still further object is to provide such a mechanism which is solenoid-actuated and provided with an overtraveling flexure pivot for accommodating minor roll-separating forces without disengagement of the actuating solenoid poles (from the armature). Other and further objects of advantage of the invention will be evident upon consideration of the following disclosure of embodiments illustrating the best modes of carrying out the invention.

INVENTION SUMMARY

In brief summary, one purely illustrative embodiment of the invention (though not necessarily representative) will be described comprising a selectably-depressible pinch roll assembly for advancing punched cards, this assembly including a base frame carrying solenoid pole pieces, an armature-frame, flexure-mounted from the base frame on a first flexure strip length and carrying an armature portion arranged to operatively confront these pole pieces so their attraction will pivot the armature-frame for card engagement, and a roll-frame flexure-mounted from the armature-frame on a second flexure strip length (which may be merely an extension of the first strip length) so as to advancingly engage a card (against a drive roll) when the armature frame is so pivoted, the roll frame including a return spring arrangement for biasing the roll-frame and armature frame together, plus associated stops, etc. This assembly provides a prescribed minimum engaging force on advanced cards and yet maintains the indicated armature-pole engagement despite minor countervailing impulses, such as from card-thickness anomalies; the latter being accommodated by the overtravel resilience of the second flexure length.

In the drawings, wherein like reference numerals denote like parts;

FIRST EMBODIMENT

Figure 1:
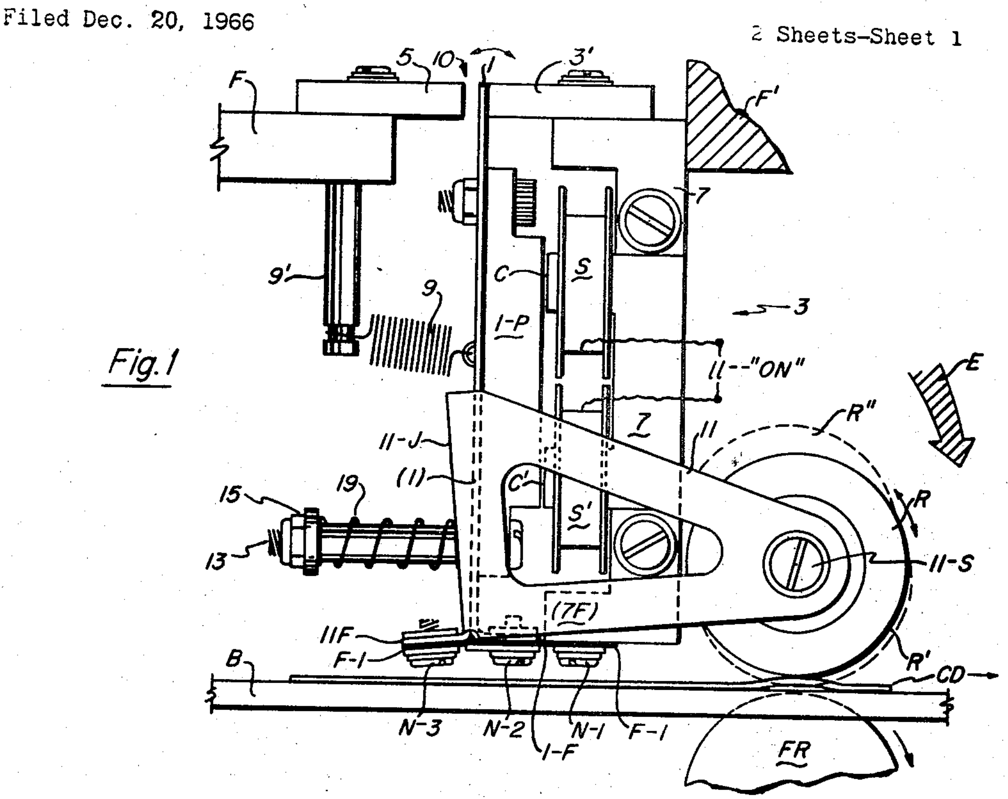
FIGURE 1 is a side elevation, somewhat simplified for clarity, of a first embodiment of the invention, illustrating a pinch roll assembly with the armature-frame in "actuated" (card-engaging) condition with a card "bump" and with the pinch roll frame in "upset" condition, being resiliently pivoted away from the armature frame by the bump.
Figure 2:
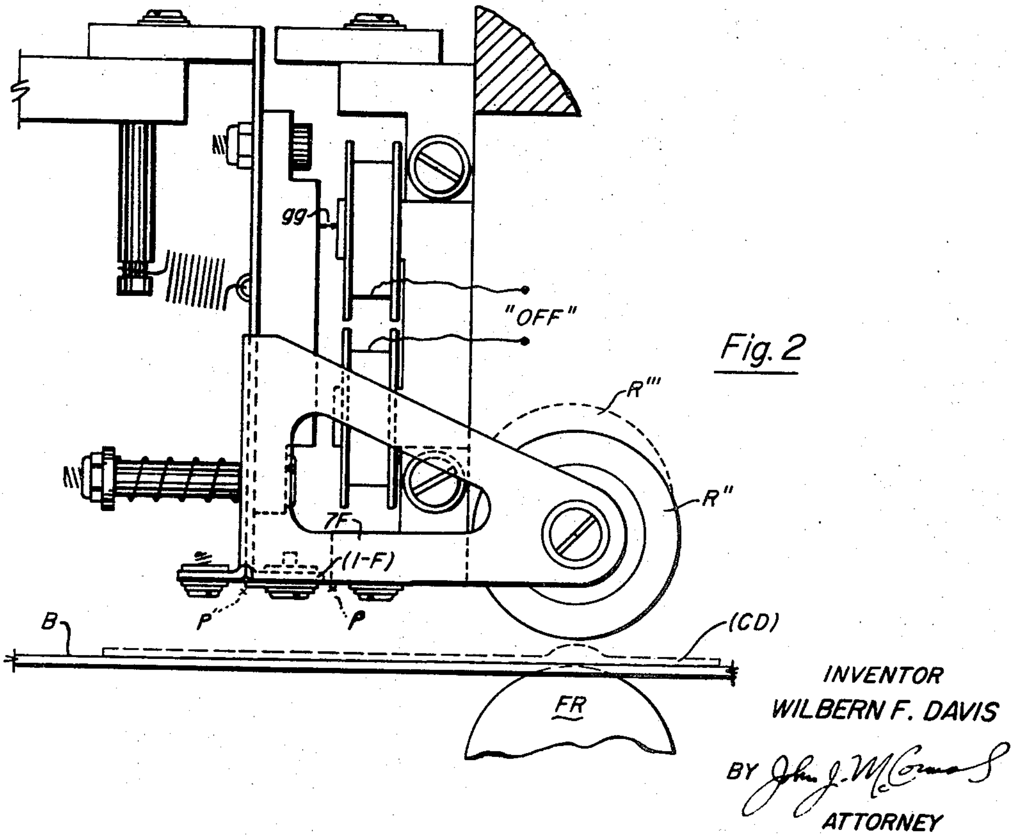
FIGURE 2 is the same as FIGURE 1 with the armature frame and the roll frame both in unstressed "rest" condition and the rolls out of card-engagement.

Referring now to FIGURES 1 and 2, a solenoid-actuated pinch roll assembly 10 is shown for presenting a pinch roll R in operative relation with computer unit records CD (e.g. punched card), assembly 10 being mounted from a fixed stable base (portions F, F′), such as the main frame of a card reader. Records CD may be understood as being periodically injected along a support platform B into operative relation with roll R to be advanced (along the direction of the arrow) by opposed rolls R, FR to be thereafter removed (by means not shown), all this being generally conventional and well understood by those skilled in the art. Assembly 10 generally comprises a solenoid assembly 3 including a solenoid block 7 fixedly mounted from machine frame F′, a primary (armature) frame 1, resiliently mounted from block 7 being cantilevered out on a first length of a flexure strip F–1; and further including a secondary (roll) frame 11 resiliently pivoted from primary frame 1 through a second flexure strip length, here preferably comprising an extension of strip F–1, frame 11 thus carrying pinch roll R, rotatably journaled therein. Solenoid assembly 3 thus includes block 7, poles C, C′ carried thereon together with associated coils S, S′ and leads 11. Primary frame 1 will be understood as including a magnetizable armature 1–P arranged, conventionally, to be attracted toward poles C, C′ of solenoid assembly 3. Poles (or cores) C, C′ are conventional in being operatively surrounded by energizing coils S, S′ respectively, so as to project a prescribed magnetic field when the energizing "select" (or "ON") current is applied to leads 11 and to thereby pull armature 1–P against themselves as shown in FIGURE 1.

According to an important feature of the invention, the armature frame and roll frame are both flexure-strip-pivoted (adjacent points P, P′, respectively), so that these pivot points lie closely adjacent the plane of card CD. The flat leaf spring comprising flexure strip F–1 is provided to pivot frame 1 resiliently from block 7, being affixed, such as by clamp N–1, at one end thereof to block flange 7–F and at the other end to a mounting portion, or armature flange, 1–F of primary frame 1, such as by the indicated clamp means N‘2, or the like. A second similar flat leaf spring length, preferably an extension of F–1 as shown, is likewise clamped to armature flange 1–F at one end (e.g. also by clamp N–2) and is attached, such as by clamp N–3, at the other (free) end thereof along a flange portion 11–F of roll frame 11 for flexure pivoting thereof relative to armature frame 1. Flexure F–1 thus comprises a first resilient cantilever length between block 7 and point P for supporting armature frame 1 to be flexure-pivoted relative to block 7 about pivot point P, while a second like flexure length extends beyond F–1 to point P′ for similarly pivoting roll frame 11 about pivot point P′ relative to frame 1. Flexure lengths F may be made of strip-shaped leaves of high quality flexible sheet material, such as spring steel, their flat shape being adapted to permit the indicated pivoting reciprocation of their respective frame members perpendicular to their elongate planes while offering convenient flat clamping surfaces and sufficient lateral rigidity to keep their supported frames rigid in other than the pivot directions.

It is important to use these, or equivalent, spring members in such a device as those indicated especially because of the high frequency flexing typically associated with the typical high speed advancement of unit records associated with data processing systems. This, of course, means that springs F will experience rapid flexing and internal stresses, making it advisable, at times, to use such materials as steel, beryllium copper, Phosphor bronze or the like and to choose compatible dimensions, to provide stops, etc. so that the springs operate well within the static and dynamic stress limits and fatigue limits of the flexural material. Of course, it is of significant advantage that this flexure mounting never requires any lubrication, adjustment or the like. Furthermore, these flexure strips may be inexpensive, e.g. be stamped from suitable sheet material with no particular concern for critical dimensional tolerances, such as with conventional pivot mountings using bearings, abrading pivot surfaces, etc. In certain cases, such a flexure spring pivot arrangement will be especially advantageous in minimizing horizontal skew of the pivoted roll R with respect to the normal to the driving surface of drive roll FR. Such skew can degrade pinching forces, cause slippage on the card, distort the card or the like. Flat springs F tend to maintain roll R aligned flat against record CD with no tipping, twisting or the like, e.g. due to uneven roll wear.

Primary frame 1 is adapted to extend between the attracting pole faces of solenoid cores C, C′ and to confront them with armature 1–P so it may be magnetically attracted into engagement, or near engagement, therewith when stopped against an "ON" stop 3′, being stop-limited in its "OFF" (or unactuated) excursion by "OFF" stop 5. Frame 1 may be spring-biased to normally engage stop 5 by extension coil spring 9 or a suitable alternative such as merely by the inherent stiffness of flexure length F–1. The face of armature 1–P confronting poles C, C′ will be magnetic, e.g. being made of ferromagnetic material. The balance of frame 1 is comprised of any rigid structural material, preferably light (such as of aluminum), as with other non-magnetic metal elements of this assembly. The flat planar attachment of flanges 1–F, 7–F with flat spring length F–1 acts to rigidly mount frame 1 to be rigid in all directions except the indicated pivot direction. Stop limit 3′ is helpful for preventing damaging impact of armature 1–F against the faces of poles C, C′ which are characteristically made of a soft iron alloy (for high magnetic efficiency) and thus subject to wear.

Roll frame 11 is flexure-pivoted and cantilevered out from armature flange 1–F on the extended length of strip F–1. Frame 11 serves to mount roll R so as to be resiliently pivotable relative to armature frame 1, as aforementioned. Any like frame or bracket means may alternatively be provided which is rigid, light and presents pinch roll R so as to assume the indicated operative positions, namely: "normal," actuated position R′ (for driving engagement with records of "normal" thickness), "upset" (or cocked) position R (for driving engagement with "over-thick" records), "rest" position R″ (disengagement) and "cocked-rest" position R‴, as described hereinbelow, A suitable spring means is provided to return frame 11 from pivoting, such as compression coil spring 19 wound upon threaded coupling shaft 13, the latter also serving to join frame 11 to frame 1. Spring 19 thus biases frame 11 towards frame 1 to be normally engaged thereagainst. Spring 19 may be force-adjusted conventionally by limit nut 15 or the like. Electromagnet (solenoid) unit 3 may thus attract frame 1 pivoted into "ON" condition against the spring force of return spring 9 (against stop limit 3′) when a prescribed "ON" current is applied to solenoid coils S, S′; while upset forces (opposite direction E) may, within limits, oppose this "ON-pivoting," being accommodated by pivoting of frame 11 away from frame 1 (vs. spring 19) and thus prevented from "backing off" armature 1–P.

In operation, the above elements will be appreciated by those skilled in the art to operate so as to maintain the pinch roll R normally in "OFF-position" R″, sufficient to clear anticipated card thickness anomalies (e.g. FIGURE 2), when coils S, S′ are unenergized (OFF as in FIGURE 2). These elements also act to thrust pinch roll R along actuation direction E into a normal-"ON" position R′ for engagement with cards of normal thickness for advancement thereof by frictional engagement of rolls R, FR therewith. The actuating means must thus provide a prescribed minimum depressing force normal to cards CD and to approach drive roll FR from the normal. The resilient overtravel elements of the invention will also permit "upset forces" (opposite arrow E) such as card protrusions (FIGURE 1) or the like, to upset (back off) pinch roll R, such as to a prescribed "upset position" R without disengaging armature 1–P from poles C, C′. In addition, it will be understood that the normal-"ON" position R′ may be made variable (e.g. by shims at 11–F; by shifting cores C, C′ and stop 3′, etc.) and may be located slightly closer to drive roll FR for a slight over-pressure on card CD to compensate for wear on the pinch roll R and like inter-roll gap variances, while yet maintaining the prescribed minimum frictional engagement and depressing force on the cards.

ALTERNATE EMBODIMENT

Figure 3:
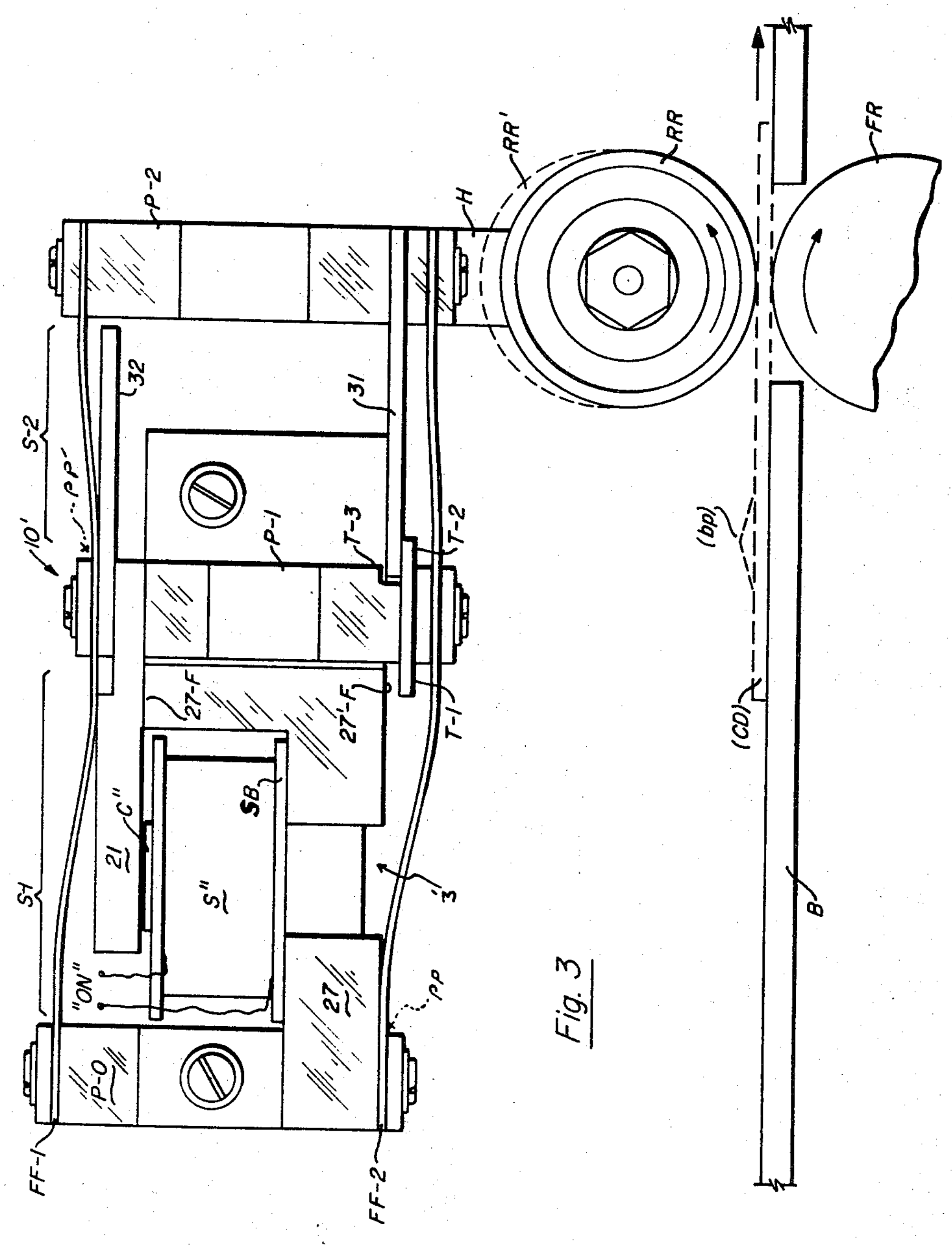
FIGURE 3 is a fragmentary side elevation of an alternate pinch roll embodiment indicating an armature frame in the "actuated" (card-engaging) condition and a roll frame in the normal unstressed condition; the subject engaged card being of "normal" thickness.

An alternate, and somewhat different, embodiment is shown in FIGURE 3 comprising a pinch roll mounting assembly 10′ having the same or similar structural and operating characteristics as the aforedescribed assembly 10 except as hereinafter indicated. Thus, a primary frame member, or armature block P–1 is cantilevered out from a fixed mount, such as pillar P–0, attached to the main frame of a machine, block P–1 being suspended on a pair of flexure lengths, namely segments (lengths) S–1 of flat-leaf flexures FF–1, FF–2. Block P–1 spaces flexures FF–1, FF–2 apart, and relatively parallel, being attached thereto by the indicated clamping means or the like. Block P–1 will be seen to carry a magnetic armature projection 21 and a pair of projecting stops T–1, T–2 and also includes a cut-out defined by a stop shoulder T–3. Block P–1 preferably also carries a limit bar 32 adapted to limit the flexing curvature of flexure strip FF–1 along segments S–2 thereof, thus preventing any "folding" or "S-curving" thereof (e.g. from handling, overtravel, etc.) and keeping blocks P–1 and P–2 separated by a substantially constant spacing. Segments S–1 are similarly "buckle-limited" by confronting surfaces of armature 21 and magnet frame 27. An electromagnetic actuating means, i.e. solenoid assembly 3′ is provided to selectively translate block P–1 and its supported elements between stop limits and comprises a magnet frame 27 supporting an electromagnet core C″ and a solenoid bobbin SB wrapped with an energizing solenoid coil S″ to surround core C″ so that an "ON" current signal through coil S″ will provide an attracting magnetic flux pulling armature 21 toward core C″ into engagement with an "ON" stop face 27–F. Stop 27–F may comprise the end of extension 27′ of frame 27 as shown, the opposite side of the frame similarly providing an opposed "OFF" stop face 27′–F. Engagement of stop face 27′–F with stop T–1 on block P–1 thus can establish a prescribed, variable unactuated "rest" position for P–1 and the rest of pinch roll assembly 10′ mounted therefrom. Solenoid 3′ may be otherwise quite conventional in the structure and operation of its elements.

According to another feature of the invention, flexures FF–1, FF–2 are extended along a prescribed second segment (or span length) S–2 to be clamped into supporting engagement with a roll block P–2, cantilevered from armature block P–1 much as P–1 is relative to fixed pillar P–0. Block P–2 serves to carry the pinch roll, such as through depending bracket H and axle means journaled therein in prescribed rigid relation with block P–2. Roll block P–2 is thus flexure-pivotable (such as by "back-off" forces on the pinch roll as above described, e.g. from bump "*bp*") relative to frame P–1, being advantageously flexure-cantilevered outboard thereof and between extensions of the same flexure segments. Block P–2 also carries an antibuckle/stop bar 31 projected rigidly therefrom into excursion-defining engagement with P–1, i.e. between stops T–3, T–2 thereon. Bar 31 can also function somewhat as a "buckle limit" for segment S–2 of strip FF–2, much as limit bar 32 does for segment S–2 of strip FF–1.

Assembly 10′ will thus be seen to function quite similarly to the aforedescribed assembly 10. For instance, armature block P–1 will normally assume a prescribed rest position, with stop T–1 engaged against limit face 27′–F, so as to establish a corresponding satisfactory "bump-clearing" rest position RR′ for the pinch roll, out of engagement with record CD and with any protrusions thereof, such as "bump" *bp*. When activated, however, block P–1 will be solenoid-pulled downwardly just sufficient to press the pinch roll onto CD with a prescribed minimum force, i.e. to "actuated position" RR to coact with driving roll FR as aforedescribed. Thus, the rolls RR, FR will be positively and drivingly engaged with an intermediate card CD with at least a prescribed minimum force when the select ("ON")-current pulse flows through coil S″ to pull armature 21 toward core C″ into limiting engagement with stop face 27–F. Block P–1 will then have been pivoted, by the solenoid actuator assembly, flexingly on segments S–1 of flexure strips FF–1, FF–2. In this way, such an armature block structure can advantageously function supplementarily to also align the flexure suspension to mount the armature piece therebetween compactly and protectingly, to carry stop limits, and, as seen below, to anchor the secondary roll-block supporting flexure suspension for the pinch roll.

Summarizing the operation of the pinch roll suspension assemblies, it will be recognized that assembly 10 flexure-suspends armature block 1 and all elements carried thereby (including the pinch roll) to be flexure-pivotable relative a fixed base structure about a prescribed armature-pivot-point P, while also flexure-suspending roll block 11 to be flexure-pivoted relative armature block 1 etc. about a prescribed roll-pivot-point P′. Analogously, it will be recognized that alternative assembly 10′ flexure-suspends armature block P–1 and all elements carried by it (including the pinch roll) to be flexure-pivotable about a pair of armature-pivot-points PP (only one indicated), roll block P–2 being likewise flexure-pivotable relative P–1 about a pair of roll-pivot-points PP′ (only one indicated). Here, unlike assembly 10, the "pivoting" is really a substantially rectilinear movement down normal upon roll FR—a highly desirable, reliable translation mode.

Those skilled in the art will appreciate that these roll mounting assemblies are quite simple in construction, and are very compact, yet operate with good efficiency. In particular, in assembly 10′, roll block P–2 is efficiently suspended within the same unitary flexure assembly as armature block P–1, while being flexibly pivotable relative thereto, giving the overall assembly 10′ two degrees of flexing freedom, inter-dependent upon one another. Both assemblies provide the pinch roll with a resilient overtravel capability in the actuation direction. Assembly 10 is similarly attractively simple, using a single flexture leaf to support both blocks.

It will be appreciated that, within the limits of the appended claims, the invention may be otherwise implemented for equivalent applications, with equivalent environmental elements and conditions and using equivalent means. For instance, although the illustrative applications were for resiliently suspending a pinch roll for advancing computer documents, it will be apparent that related frictionally-engaged sheet advancing means may be similarly suspended, especially in data processing type sheet handling systems. That is, while a pinch roll was taught as the reciprocably-actuable, frictional, sheet-engaging device, being so flexure-suspended, it will be appreciated that other equivalent loads may be thus suspended. Similarly, while solenoid magnet actuation is taught, other equivalent means will often be suitable. Also, while a "normally-disengaged" armature is described (for upper roll), equivalently a "normally-engaged" armature may instead be used at times, e.g. for lower roll, kept "OFF" by engaged permanent magnet field, and allowed to be spring-engaged "ON" by application of a "bucking" solenoid field to cancel this permanent magnet field. While flat-leaf flexure strips are shown for flexural pivot-mounting of both blocks, in common, it will be understood that similar flexure means may be separately provided for each block as a non-frictional, resilient pivot suspension therefor. While particular spring bias and stop-limiting means were indicated, it will be appreciated that these elements may be implemented by equivalent means known in the art. Similarly, the illustrated elements may also provide their functions as combined and modified together. Thus, block 7 may comprise a mere extension of the machine frame, return-spring 9 may be provided simply by the inherent resilient flexure segment F–1, and the like. Similarly, while the invention is most advantageous for application with solenoid-actuated mounting arrangements, it will be appreciated that in some circumstances, it may be used with different, analogous actuators.

What is claimed is:

1. In a selective sheet advance assembly including a wait station in a machine for manipulating sheets of prescribed thickness range at computer speeds, a pair of roll means disposed adjacent said station so as to translate sheets therefrom at selectable times, one of said roll means comprising a pinch roll mounted on a prescribed actuatable block arranged to be selectively pivoted toward a companion drive roll into sheet advancing relation therewith, an improved mounting arrangement comprising:

first flexure means pivotably coupling said block to the frame of said machine and cantilevered out therefrom, said block being thus arranged to normally assume a prescribed "rest" condition and to be actuated pivotingly on said flexure means into a prescribed "ON" condition;

a pinch roll mount adapted to carry said pinch roll rotatably mounted therein; and second flexure means pivotably coupling said roll mount to said block and cantilevered out therefrom, said mount being arranged to normally assume a "rest" condition against said block whereby said pinch roll is drivingly engaged with sheets of a prescribed "normal" thickness range when said block assumes said "ON" condition, and also being arranged to be resiliently urged away from said block, pivotingly on said second flexure means, and into various "stressed" conditions responsive to engagement of said pinch roll with sheet thicknesses above said normal range, when said block is in "ON" condition and without disengaging it therefrom.

2. The combination as recited in claim 1 wherein is also included magnetic actuation means adapted to actuate said block into said "ON" condition.

3. The combination as recited in claim 1 wherein said flexure means comprise at least one relatively flat flexure leaf wherein said first flexure means comprises a first length of each said leaf; wherein said second flexure means comprises an extended second length of each said leaf consecutive to said first length, at least one of said flexure leaves locating said first and second lengths thereof so that the pivot points defined thereby for pivoting of said block and said roll mount, respectively, are disposed relatively adjacent the surface of said sheets.

4. The combination as recited in claim 3 wherein is also included magnetic actuation means adapted to actuate said block into said "ON" condition.

5. The combination as recited in claim 4 wherein said first and second flexure means comprise first and second lengths of a single flexure strip, wherein rest spring means are provided for maintaining said block and roll mounts in said "rest" conditions; wherein said pinch roll is an idler roll; wherein a pair of stops are provided for defining said "rest" and "ON" conditions of said block; wherein said actuator means comprise solenoid magnet means and wherein said block includes a magnetic armature portion operatively confronting said solenoid magnet means.

6. The combination as recited in claim 3 wherein said flexure means comprise a pair of flat-leaf flexures, each having consecutive first and second lengths thereof, said first lengths and second lengths respectively being relatively equal and cantilevered out from said frame to be relatively parallel wherein said block comprises a simple armature pillar attached to said leaves at said first lengths to extend therebetween spacing them parallel, said armature pillar also carrying armature means and stop means for establishing the excursion limits thereof; wherein said roll mount comprises a roll pillar similar to said armature pillar and similarly attached between said first and second leaves at said second lengths thereof so as to mount the frictional sheet-engaging pinch roll into driving frictional relation with said normal-thickness sheets when said armature pillar is actuated "ON," also accommodating overthicknesses and like disengaging thrusts without release of said armature according to the said resilient mounting of said roll pillar from said armature pillar.

7. The combination as recited in claim 6 wherein a magnet armature is mounted from said armature pillar to project between said leaves and wherein magnetic actuation means are mounted from said machine frame so as to be adapted to actuate said armature and thus selectively thrust said armature pillar into and out of said "ON" condition.

8. The combination as recited in claim 7 wherein said magnetic actuation means comprises a solenoid magnet mounted upon a solenoid block, said block being cantilevered out from said machine frame, said block including a pair of opposed stop faces, a first one of stop faces being adapted to stoppingly engage said armature; wherein are provided on said armature pillar rest-stop means and a pair of spaced, opposed roll-pillar stop means, said rest stop means being arranged to stoppingly engage the other one of said stop faces; wherein said roll-pillar is provided with a stopping detent adapted to stoppingly engage said roll-pillar stop means to thus define the overtravel excursion of said pinch roll in "ON" condition; and wherein are provided on said pillars, anti-buckling surfaces disposed adjacent deflectable portions of said flexure leaves to prevent the buckling thereof.

9. In a selectively operable, advance mechanism for advancing unit-records through a machine in data processing modes, said mechanism including support means for presenting unit records in a prescribed waiting condition, selectively-engageable frictional advance means suspended from the frame of said machine so as to be selectively thrust into operative advancing engagement with said records in said waiting condition, and selectively-energizeable magnetic actuation means associated with said advance means and adapted to initiate said operative engagement, the improvement therewith comprising mounting means for flexibly coupling said advance means to said machine frame in operative relation with said magnetic means, yet so as to tolerate anomalies in record thickness, said mounting means comprising in combination:

primary flexure means secured to said frame so as to project therefrom; armature means affixed on said flexure means at a prescribed projected length thereof for attractable relation with said magnetic means and adapted to be flexibly pivoted thereon to an "ON" position when attracted by said magnetic means; secondary flexure means attached to said armature means and cantilevered out therefrom a prescribed length; and roller frame means attached adjacent the outer end of said secondary flexure means and adapted to support said advance means in prescribed advancing relation with said records in said waiting condition when said armature means has been so attracted into said "ON" position, said roller frame means also being flexurably pivotable with respect to said armature means upon urgings from said records away from said "ON" position to thus prevent separation of said armature and magnetic means.

10. The combination as recited in claim 9 wherein said frictional advance means comprises a pinch roll; wherein said flexure means comprise consecutive first and second flexture strip lengths and wherein said magnetic actuation means comprises a solenoid magnet assembly disposed in operative attracting relation with said armature means.

11. In a pinch roll drive mechanism including a pinch roll adapted to be selectively thrust by prescribed thrust means into frictional, record-engaging relation with a prescribed "drive plane" locus, an improved resilient-overtravel suspension comprising:

a first spring system supporting a mounting frame in actuable relation with said thrust means, said frame, in turn, being adapted to carry said pinch roll so that, when so actuated, said roll is thrust operatively adjacent said locus; and an overtravel spring system mounting said pinch roll to said frame means so as to normally accommodate said actuation while also accommodating prescribed resistance forces opposing said actuation to allow said pinch roll to be resiliently "backed-off" from said locus when so actuated.

References Cited

UNITED STATES PATENTS

| | | | |
|---|---|---|---|
| 828,556 | 8/1906 | Kunath | 271—51 X |
| 3,073,590 | 1/1963 | Romeo | 226—187 X |
| 3,136,467 | 6/1964 | Olson | 226—177 |

EDWARD A. SROKA, *Primary Examiner.*

U.S. Cl. X.R.

271—80